US009448001B2

(12) United States Patent
Kinkel

(10) Patent No.: US 9,448,001 B2
(45) Date of Patent: Sep. 20, 2016

(54) INDIRECT COOLING UNIT

(71) Applicant: UNITED METAL PRODUCTS, INC., Tempe, AZ (US)

(72) Inventor: Stephen W. Kinkel, Phoenix, AZ (US)

(73) Assignee: UNITED METAL PRODUCTS, INC., Tempe, AZ (US)

( * ) Notice: Subject to any disclaimer, the term of this patent is extended or adjusted under 35 U.S.C. 154(b) by 436 days.

(21) Appl. No.: 14/068,991

(22) Filed: Oct. 31, 2013

(65) Prior Publication Data
US 2015/0114027 A1    Apr. 30, 2015

(51) Int. Cl.
| F25B 47/00 | (2006.01) |
| F25D 7/00 | (2006.01) |
| F25B 31/00 | (2006.01) |
| F25B 6/02 | (2006.01) |
| F25B 25/00 | (2006.01) |
| F24F 12/00 | (2006.01) |

(52) U.S. Cl.
CPC .............. *F25D 7/00* (2013.01); *F24F 12/002* (2013.01); *F25B 6/02* (2013.01); *F25B 25/005* (2013.01); *F25B 31/006* (2013.01); *Y02B 30/563* (2013.01)

(58) Field of Classification Search
CPC . F24F 5/0035; F24F 2001/0092; F25D 7/00; F25B 25/005; F25B 31/006; F25B 6/02
USPC .................................................. 62/305, 314
See application file for complete search history.

(56) References Cited

U.S. PATENT DOCUMENTS

| 3,908,393 A * | 9/1975 | Eubank ................ B60H 1/3202 62/305 |
| 4,107,942 A * | 8/1978 | Fairman .................. F24F 5/001 62/305 |
| 4,259,268 A * | 3/1981 | DiRoss ................. F24F 12/002 261/151 |
| 6,178,762 B1 * | 1/2001 | Flax ..................... B01D 53/261 62/271 |
| 6,422,030 B1 * | 7/2002 | Calvert ................. F24F 5/0035 62/310 |
| 2004/0148956 A1 * | 8/2004 | Arshansky .............. F25B 9/008 62/335 |
| 2005/0046050 A1 * | 3/2005 | Palmer .................. F24F 5/0035 261/97 |
| 2011/0066298 A1 * | 3/2011 | Francino ................. F01K 9/003 700/290 |
| 2011/0100602 A1 * | 5/2011 | Kinkel .................. F24F 5/0007 165/104.19 |
| 2012/0211198 A1 | 8/2012 | Kinkel |

* cited by examiner

Primary Examiner — Orlando Aviles Bosques
(74) Attorney, Agent, or Firm — Schmeiser, Olsen & Watts LLP

(57) ABSTRACT

A cooling system includes a first indirect heat exchanger configured to receive return air from an interior space and output conditioned air back into the interior space. The cooling system further includes a second indirect heat exchanger configured to receive outside air. A fluid conduit directs a flow of cooling fluid from the first indirect heat exchanger, through the second indirect heat exchanger, and back to the first indirect heat exchanger. A pump circulates the cooling fluid between the first and second indirect heat exchangers at a fluid velocity that is relatively slow. Additionally, return air and outside air flows through corresponding indirect heat exchangers at air velocities that are also relatively slow. The relatively slow fluid velocity and air velocities enhance an efficiency of heat transfer between the cooling fluid and the return air and between the cooling fluid and outside air.

11 Claims, 5 Drawing Sheets

INDIRECT COOLING UNIT

TECHNICAL FIELD OF THE INVENTION

The present invention relates generally to cooling systems. More specifically, the present invention relates to high efficiency indirect cooling.

BACKGROUND OF THE INVENTION

A data center is a facility used to house computing systems and associated components, such as telecommunications and storage systems. A data center can occupy one room of a building, one or more floors, or an entire building. The equipment is typically in the form of servers mounted in cabinets, which are usually placed in single rows forming corridors (so-called aisles) between them. This allows people access to the front and rear of each cabinet. The data center typically additionally includes redundant or backup power supplies, redundant data communications connections, environmental controls (e.g., air conditioning, fire suppression), and security devices.

Manufacturers of data center equipment continue to increase compute capability of servers while at the same time improving compute efficiency and decreasing the server size. However, the power consumption of such servers is also rising despite efforts in low power design of integrated circuits. With the increased power consumption comes a commensurate increase in concentrated heat loads produced by the servers, network equipment, and storage facilities. The heat dissipated by this equipment is exhausted into the data center room. The heat collectively generated by densely populated racks can have an adverse effect on the performance and reliability of the equipment in the racks, since the equipment relies on the surrounding air for cooling. In addition to temperature, humidity can have an adverse effect on data center equipment. If the humidity is too high, water may begin to condense on internal components. If the humidity is too low, static electricity discharge may damage components. Accordingly, precisely controlling the environment in a data center is critical to maximizing availability and performance of essential equipment. And the challenges of cooling these spaces mount as the move to smaller servers results in significantly higher power consumption and more heat generation.

Heating, ventilation, and air conditioning (HVAC) systems required to control the temperature and humidity of the data center have been estimated to account for between twenty five to forty percent of power usage in data centers. Accordingly, HVAC systems are often an important part of the design of an efficient data center. In particular, infrastructure manufacturers and data center designers and operators are focusing on reducing power consumption from the non-compute part of the overall power load, which includes the HVAC systems, in order to achieve significant cost savings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, the Figures are not necessarily drawn to scale, and:

DETAILED DESCRIPTION

Embodiments entail a cooling system that includes a first indirect heat exchanger and a second indirect exchanger, where the first heat exchanger functions to cool return air from an interior space using a cooling fluid, and the second heat exchanger functions to cool the cooling fluid circulating between the first and second heat exchangers with outside air. The cooling fluid circulates within a fluid conduit of cooling system at a fluid velocity that is significantly less than the fluid velocities of conventional systems. Additionally, velocities of the airflow through the system (e.g., the return air from the interior space, as well as the outside air) are significantly less than conventional designs. The lower air flow velocities and lower fluid velocities of the circulating cooling fluid, combined with the structural arrangement of the heat exchangers within the cooling system can yield an effective air cooling configuration at significant power savings. Furthermore, through the implementation of indirect heat exchangers within the cooling system, highly corrosive water cannot come into contact with the heat exchangers thereby effectively increasing the lifespan of the cooling system.

Figure 1:
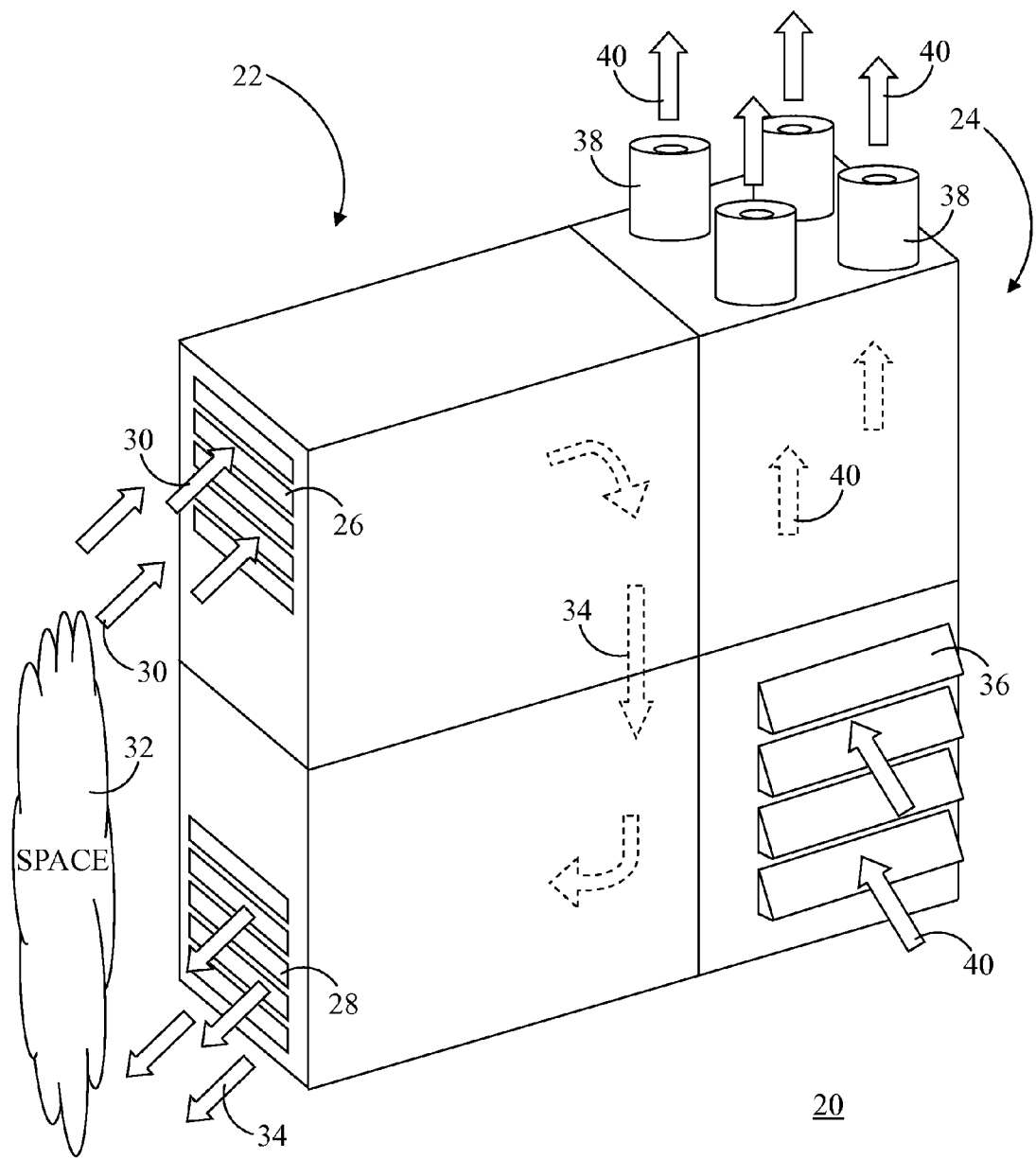
FIG. 1 shows a simplified perspective view of a cooling system in accordance with an embodiment.

FIG. 1 shows a simplified perspective view of a cooling system 20 in accordance with an embodiment. In general, cooling system 20 includes an interior heat exchange system 22 and scavenger heat exchange system 24. Interior heat exchange system 22 includes a return air inlet 26 and a conditioned air outlet 28. Interior heat exchange system 22 is configured to receive return air 30 from an interior space 32, such as a building, via return air inlet 26. Return air 30 travels through interior heat exchange system 22 where it is cooled, and return air 30 is subsequently returned to interior space 32 as conditioned air 34 via conditioned air outlet 28.

Scavenger heat exchange system 24 includes an outside air inlet 36 and an outside air outlet 38. Scavenger heat exchange system 24 is configured to receive outside air 40 via outside air inlet 36. As will be discussed in significantly greater detail below, outside air 40 travels through scavenger heat exchange system 24 where outside air 40 is used to extract heat from a circulating cooling fluid (shown below). Outside air 40 is subsequently output from scavenger heat exchange system 24 via outside air outlet 38.

Figure 2:
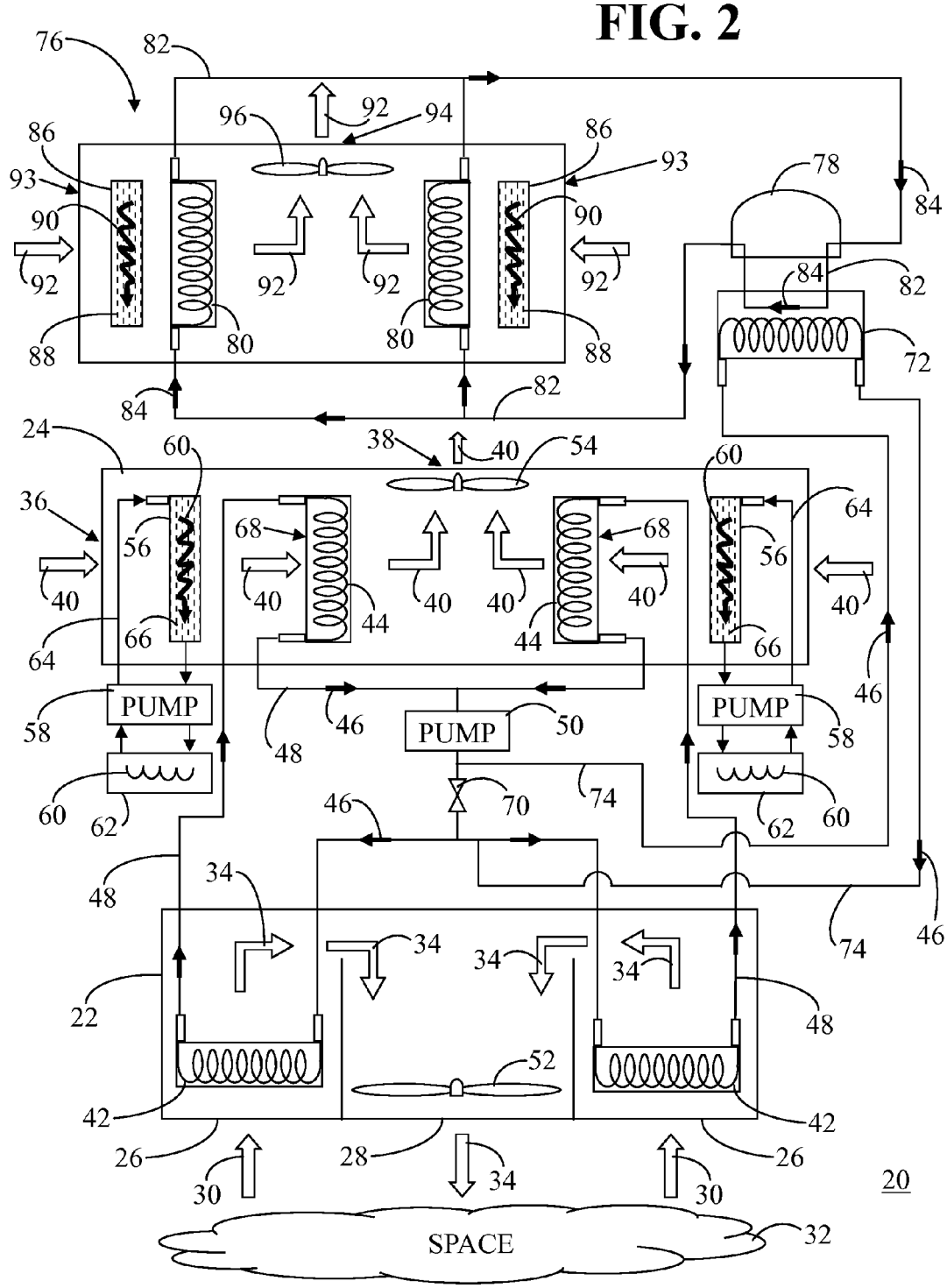
FIG. 2 shows a block diagram of the cooling system of FIG. 1.

FIG. 2 shows a block diagram of cooling system 20. In the embodiment shown in FIG. 2, interior heat exchange system 22 is a "split system" having two return air inlets 26 and two indirect heat exchangers 42. In the simplified illustration, return air 30 flows past the coils of each of indirect heat exchangers 42 where it is cooled to produce conditioned air 34. Conditioned air 34 is subsequently output from conditioned air outlet 28. Scavenger system 24 may also be a "split system" having two outside air inlets 36 and two indirect heat exchangers 44. In the simplified illustration, outside air 40 flows past the coils of each of indirect heat exchangers 44 to cool the cooling fluid within the coils. Outside air 40 is subsequently output from outside air outlet 38. Although cooling system 20 is arranged as a split system of two indirect heat exchangers 42 in interior heat exchange system 22 and two indirect heat exchangers 44 in scavenger heat exchange system 24, it should be understood that alternative embodiments may include one each of heat exchangers 42 and 44 or more than two each of heat exchangers 42 and 44 depending upon load and cooling requirements.

A cooling fluid, represented by arrows 46, flows through a fluid conduit 48 in cooling system 20. Fluid conduit 48 connects interior heat exchange system 22 and scavenger heat exchange system 24 within cooling system 20. A pump 50 is in fluid communication with fluid conduit 48. Thus, cooling fluid 46 is pumped through fluid conduit 48 via pump 50. Cooling fluid 46 within fluid conduit 48 circulates through each of indirect heat exchangers 42 in interior heat exchange system 22, through each of each of indirect heat exchangers 44 in scavenger heat exchange system 24, and returns to indirect heat exchangers 42. In an embodiment, cooling fluid 46 is water. However, those skilled in the art will recognize that other heat transporting fluids may be used in alternative embodiments.

In operation for cooling return air 30, cooling fluid 46 circulates into the coils of indirect heat exchangers 42, and return air 30 flows across the coils. Indirect heat exchangers 42 reduce a temperature of return air 30 received in interior heat exchange system 22 using cooling fluid 46 to produce conditioned air 34 which is subsequently output via conditioned air outlet 28. There is no contact between cooling fluid 46 and return air 30 while air 30 passes through indirect heat exchangers 42. Thus, return air 30 is indirectly cooled, i.e., conditioned, by cooling fluid 46. Accordingly, interior heat exchange system 22 is configured to remove heat from return air 30 as return air 30 moves through indirect heat exchangers 42 by transferring the heat to cooling fluid 46. An air fan 52 ejects conditioned air 34 from conditioned air outlet 28 back into interior space 32.

Scavenger heat exchange system 24 is configured to remove heat from cooling fluid 46, transferring the heat to outside air 40 flowing through scavenger heat exchange system 24. After flowing through scavenger heat exchange system 24, the heated outside side air 40 is blown out of system 24 via one or more outside air outlets 38 by one or more air fans 54.

In an embodiment, scavenger heat exchange system 24 additionally includes two direct heat exchangers 56, each of which is in line with one of indirect heat exchangers 44. Each of direct heat exchangers 56 includes a pump 58 which pumps water 60 from a sump 62 through a cooling circuit 64 and through an evaporative cooling media 66. Those skilled in the art will recognize that a single pump 58 and a single sump 62 may be implemented to provide water through cooling circuit 64 to each of direct heat exchangers 56 in alternative embodiments. Thus, evaporative cooling media 66 is wetted by water 60.

Each direct heat exchanger 56 is configured to receive outside air 40, and cool an air temperature of outside air 40 to produce cooled outside air 40 which is subsequently received at an outside air inlet 68 of each of indirect heat exchangers 44. This cooled outside air 40 removes heat from cooling fluid 46 circulating through the coils of indirect heat exchangers 44, and the now warmed outside air 40 is expelled from scavenger heat exchange system 24. There is no contact between cooling fluid 46 and outside air 40 while outside air 40 passes through indirect heat exchangers 44. Thus, cooling fluid 46 is indirectly cooled by outside air 40. The cooled cooling fluid 46 completes the circuit through fluid circuit 48, back through pump 50, and into indirect heat exchangers 42 of interior heat exchangers 22.

In some embodiments, cooling system 20 further includes a valve 70 in line with fluid conduit 48, another heat exchanger 72, a secondary fluid conduit 74 in fluid communication with heat exchanger 72, and a trim chiller 76. Trim chiller 76 includes a compressor 78, and a pair of condenser exchangers 80. Compressor 78 and condenser exchangers 80 are interconnected by a fluid circuit 82 in which a refrigerant 84 circulates. Trim chiller 76 may further include a pair of direct heat exchangers 86 (e.g., evaporative cooling units), each of which is in line with one of condenser exchangers 80. Each of direct heat exchangers 86 can include evaporative cooling media 88 that is wetted by water 90. Each of direct heat exchangers 86 can include a pump, a sump, and a cooling circuit (not shown for simplicity) for providing water 90 to wet evaporative cooling media 88.

In operation, outside air 92 enters chiller inlets 93 of trim chiller 76. Outside air 92 passes through the wetted evaporative cooling media 88 of direct heat exchangers 86 where it is cooled. Outside air 92 then passes over the coils of condenser exchangers 80 where outside air 92 removes heat from refrigerant 84 circulating through the coils of condenser exchangers 80. Outside air 92 is subsequently expelled from a chiller outlet 94 of trim chiller 76 via an air fan 96.

Although scavenger heat exchange system 24 can reduce the temperature of cooling fluid 46, the lowest temperature that outside air 40 can attain through direct heat exchangers 56 is limited by the wet bulb temperature of outside air 40. This is because the wet bulb temperature is the temperature of a volume of air that has been cooled to saturation at a constant pressure. When the temperature of outside air 40 cannot be lowered enough by direct heat exchangers 56, then the indirect heat exchangers 44 in scavenger heat exchanger system 24 may not be able to sufficiently cool cooling fluid 46 by the indirect cooling mode. In such an instance, trim chiller 76 may be engaged to cool cooling fluid 46. That is, valve 70 may be selectively enabled to divert at least a portion of cooling fluid 46 from fluid conduit 48 and into secondary fluid conduit 74. This portion of cooling fluid 46 will circulate into heat exchanger 72 and cooling fluid 46 will be cooled by indirect heat transfer from cooling fluid 46 into refrigerant 84 circulating through heat exchanger 72. Cooling fluid 46 subsequently returns to fluid conduit 48 and into indirect heat exchangers 42 of interior heat exchange system 22 via fluid conduit 48.

System 20 may additionally be on demand for heating. In operation for heating return air 30, scavenger heat exchange system 24 is configured to add heat to cooling fluid 46. For example, as warm outside air 40 flows through scavenger heat exchange system 24, heat is transferred from outside air 40 to cooling fluid 46. This warmed cooling fluid 46 circulates into interior heat exchanger 22 via fluid conduit 48. As cooling fluid 46 circulates into the coils of indirect heat exchangers 42 and return air 30 flows across the coils, indirect heat exchangers 42 increase a temperature of return air 30 received in interior heat exchange system 22 using cooling fluid 46 to produce conditioned air 34 which is subsequently output via conditioned air outlet 28. Thus, return air 30 may be indirectly heated, i.e., conditioned, by cooling fluid 46. Accordingly, in some embodiments, interior heat exchange system 22 may be configured to remove heat from cooling fluid 46 as cooling fluid circulates through the coils of indirect heat exchangers 42 by transferring the heat to return air 30.

Per convention, fluid velocities for cooling fluid circulating in a fluid conduit in some cooling systems is approximately four to six feet per second. In accordance with an embodiment, the fluid velocity of cooling fluid 46 circulating within fluid conduit 48 is less than the conventional four feet per second. More particularly, the fluid velocity of cooling fluid 46 is in a range of 1.1-4 feet per second.

In an embodiment, evaporative cooling media 66 is a rigid media composed of, for example, sections of corrugated material. This material may be fiberglass, plastic, cellulose, or any other suitable material. Face velocity is the velocity at which, for example, outside air 40 is drawn through the wetted evaporative cooling media 66. Per convention, face velocities for a rigid evaporative media for an evaporative cooling system are in the range of four hundred to six hundred feet per minute. In accordance with an embodiment, the velocity of outside air 40 drawn through evaporative cooling media 66 and subsequently through indirect heat exchangers 44 is less than four hundred feet per minute. More particularly, the velocity of outside air 40 may be in a range of 150-200 feet per minute.

In accordance with an embodiment, the velocity of return air 30 drawn through indirect heat exchangers 42 is less than the five hundred feet per minute air velocities of conventional systems. More particularly, the velocity of return air 30 drawn through indirect heat exchangers 42 may be in a range of 250-350 feet per minute.

The combination of a lower fluid velocity of cooling fluid 46 and a lower velocity flow of outside air 40 and return air 30 relative to conventional systems can result in an increase in the exchange of sensible heat through the tube walls of indirect heat exchangers 42 and 44. That is, the lower fluid velocity and lower air velocities increases the time for transferring heat from the warmer fluid (e.g., return air 30 or cooling fluid 46) to the cooler fluid thereby effectively cooling return air 30. Moreover, the lower fluid velocity and lower air velocities can create significant energy savings in terms of the electricity draw by pump 50 and fans 52 and 54.

Figure 3:
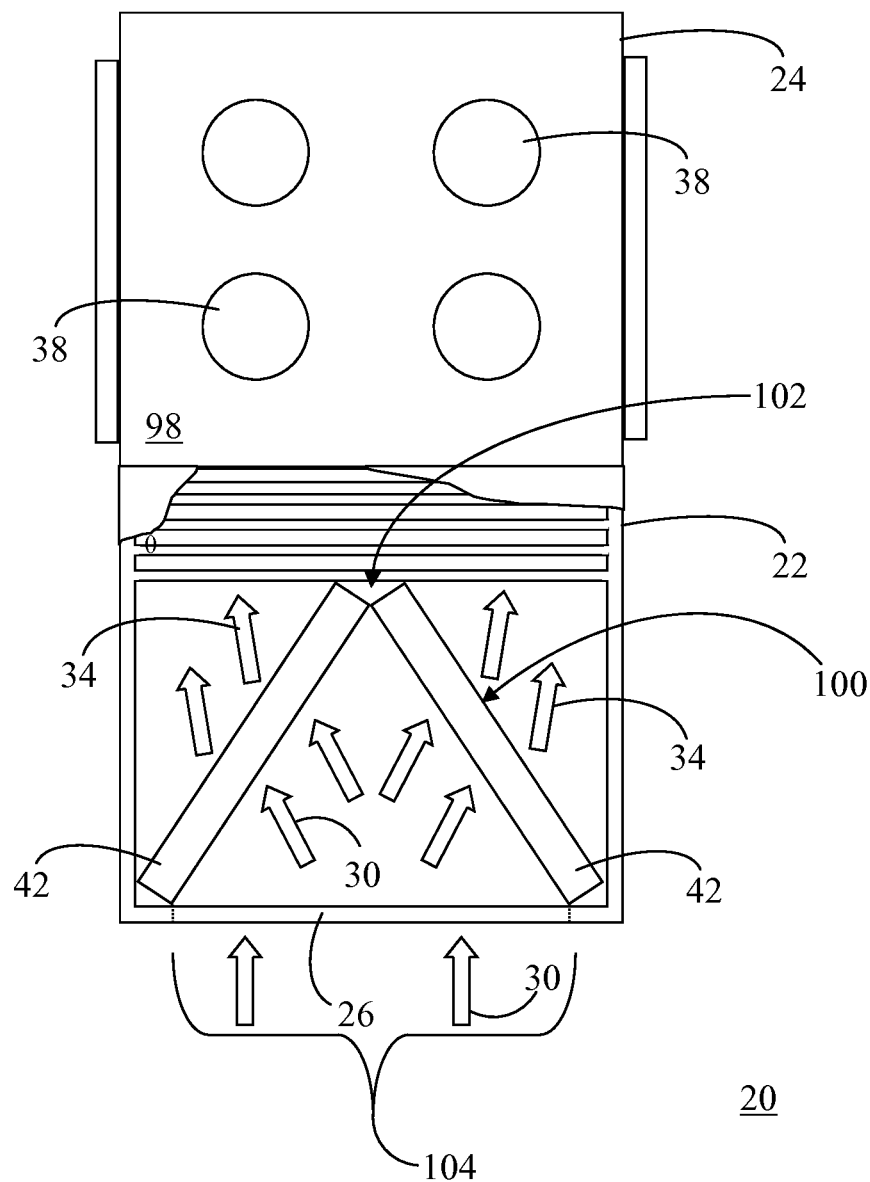
FIG. 3 shows a simplified top view of the cooling system.
Figure 4:
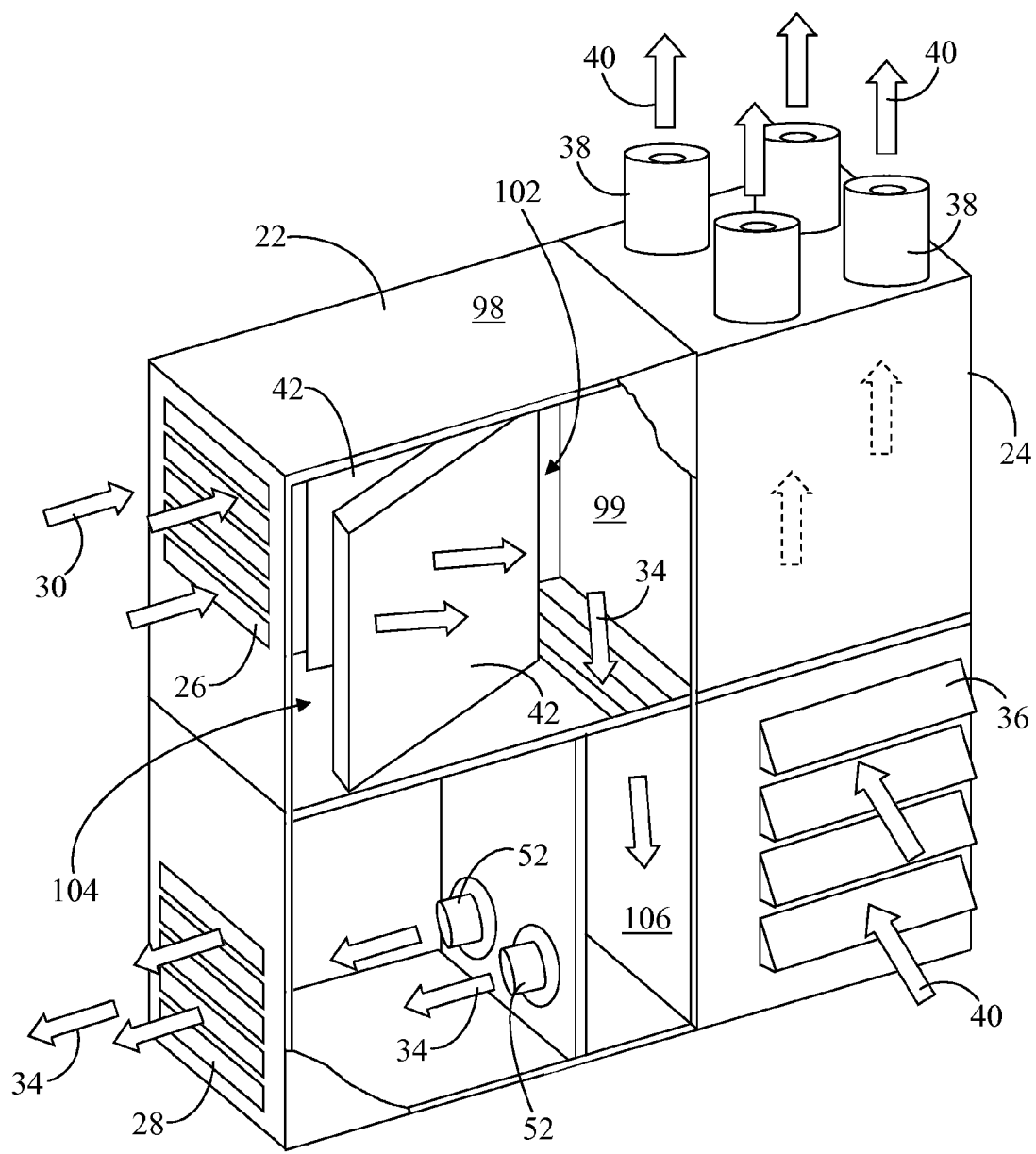
FIG. 4 shows a simplified cut-away perspective view of the cooling system.

Now with reference to FIGS. 3 and 4, FIG. 3 shows a simplified top view of cooling system 20, and FIG. 4 shows a simplified cut-away perspective view of cooling system 20. In FIG. 3, a section of a top surface of a housing 98 of cooling system 20 is removed to expose interior heat exchange system 22, and in FIG. 4, a section of a side surface of housing 98 of cooling system 20 is removed to expose interior heat exchange system 22. Fluid conduit 48 (FIG. 2), pump 50 (FIG. 2), trim chiller 76 (FIG. 2), and so forth are not shown in FIGS. 3 and 4 for simplicity of illustration.

As most clearly evident in FIG. 3, indirect heat exchangers 42 of interior heat exchange system 22 are located in an upper housing section 99 of interior heat exchange system 22. In accordance with some embodiments, indirect heat exchangers 42 are arranged in a V-formation 100 in which the part of V-formation 100 that ends in a point, i.e., an apex 102 of V-formation 100, is farther away from return air inlet 26 than a base 104 of V-formation 100. This V-formation 100 of indirect heat exchangers 42 optimizes the heat transfer capability of indirect heat exchangers 42 by maximizing surface area of exchangers 42 to which return air 30 will be exposed. Additionally, this V-formation 100 optimizes space usage by reducing an overall footprint requirement for the maximized surface area of indirect heat exchangers 42.

As more clearly visible in FIG. 4, after return air 30 has passed through indirect heat exchangers 42 to produce conditioned air 34, the conditioned air 34 is drawn into a lower housing section 106 of interior heat exchange system 22 where it is eventually expelled from conditioned air outlet 28 via air fans 52.

Figure 5:
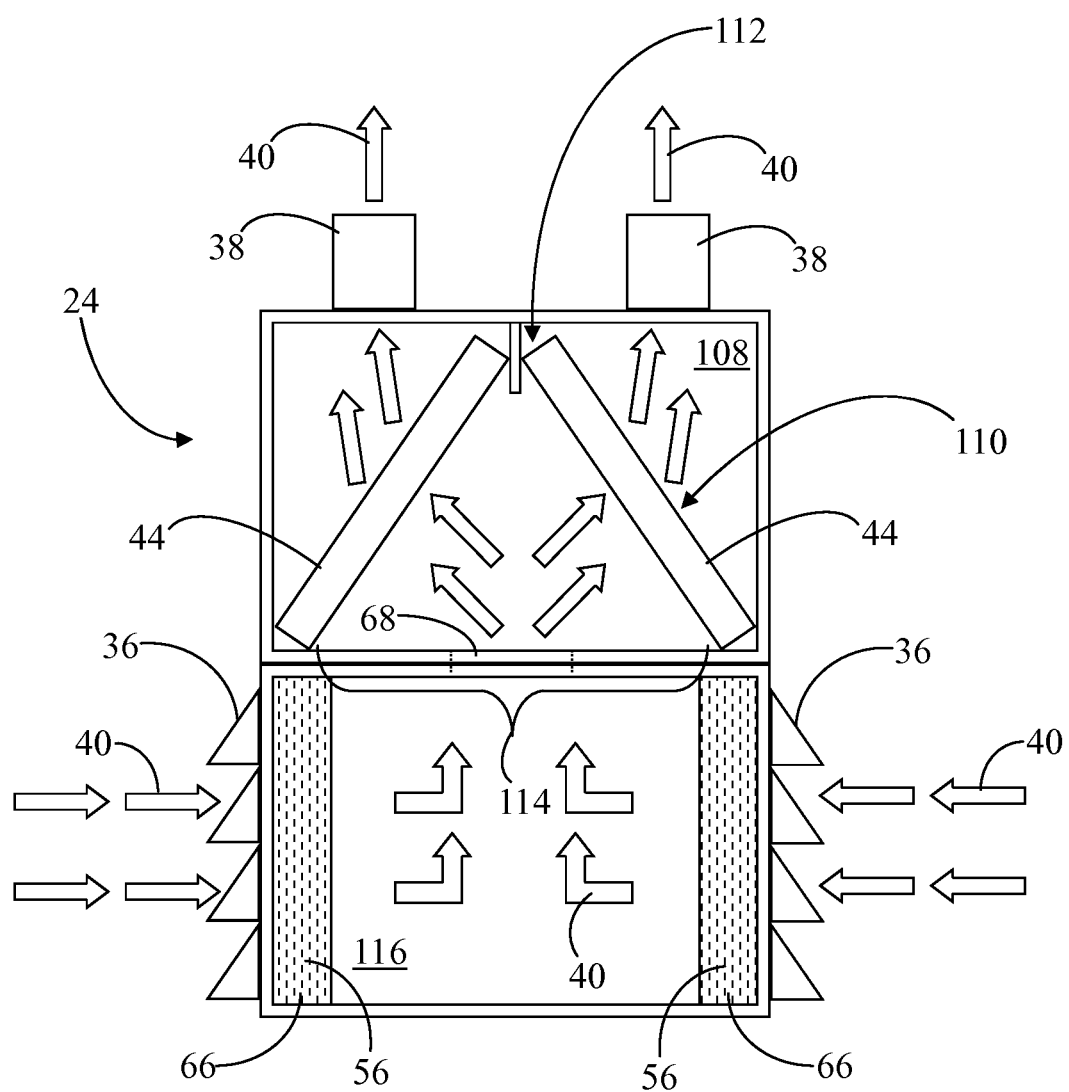
FIG. 5 shows a simplified end view of the cooling system.

FIG. 5 shows a simplified end view of cooling system 20. In FIG. 5, a section of an outer surface of a housing 98 of cooling system 20 is removed to expose scavenger heat exchange system 24. In particular, indirect heat exchangers 44 and evaporative cooling media 66 of direct heat exchangers 56 are visible in FIG. 5. However, other components of cooling system 20 are not shown in FIG. 5 for simplicity of illustration.

Like indirect heat exchangers 42 (FIG. 3), indirect heat exchangers 44 of scavenger heat exchange system 24 are located in an upper housing section 108 of scavenger heat exchange system 24. In accordance with some embodiments, direct heat exchangers 44 are also arranged in a V-formation 110 in which an apex 112 of V-formation 110 is farther away from outside air inlet 36 than a base 114 of V-formation 110. This V-formation 110 of indirect heat exchangers 44 again optimizes the heat transfer capability of indirect heat exchangers 44 by maximizing the surface area of exchangers 44 to which outside air 40 will be exposed. Additionally, this V-formation 110 optimizes space usage by reducing an overall footprint requirement for the maximized surface area of indirect heat exchangers 44.

As shown, outside air 40 is drawn into a lower housing section 116 of scavenger heat exchange system 24. Outside air 40 passes through evaporative cooling media 66 of direct heat exchangers 56 and enters upper housing section 108 via outside air inlet 68. Outside air 40 then passes through indirect heat exchangers 44 to remove heat from the circulating cooling fluid 46, as discussed in connection with FIG. 2. Outside air 40 is expelled from upper housing section 108 via outside air outlets 38. In some instances, when the temperature of outside air 40 is cool enough, direct heat exchangers 56 can be deactivated so that water 60 (FIG. 2) does not flow through evaporative cooling media 66. Thus, heat transfer from cooling fluid 46 to outside air 40 can be achieved indirectly without evaporation.

In summary, embodiments described herein entail a cooling system that includes a first indirect heat exchanger and a second indirect exchanger, where the first heat exchanger functions to cool return air from an interior space using a cooling fluid, and the second heat exchanger functions to cool the cooling fluid circulating between the first and second heat exchangers with outside air. The cooling fluid circulates within a fluid conduit of cooling system at a fluid velocity that is significantly less than the fluid velocities of conventional systems. Additionally, velocities of the airflow through the system (e.g., the return air from the interior space, as well as the outside air) are significantly less than conventional designs. The lower air flow velocities and lower fluid velocities of the circulating cooling fluid, combined with the V-formation arrangement of pairs of indirect heat exchangers in some embodiments of the cooling system can yield an effective air cooling configuration at significant power savings. Furthermore, through the implementation of indirect heat exchangers within the cooling system, highly corrosive water cannot come into contact with the heat exchangers thereby effectively increasing the lifespan of the cooling system.

Although the preferred embodiments of the invention have been illustrated and described in detail, it will be readily apparent to those skilled in the art that various modifications may be made therein without departing from the spirit of the invention or from the scope of the appended claims. Accordingly, it should be appreciated that the exemplary embodiment is an example, and is not intended to limit the scope, applicability, or configuration of the invention.

What is claimed is:

1. A cooling system comprising:
   a first indirect heat exchanger having a return air inlet and a conditioned air outlet, said first indirect heat exchanger receives return air through said return air inlet from an interior space;
   a second indirect heat exchanger having an outside air inlet and an outside air outlet, said second indirect heat exchanger receives first outside air through said outside air inlet;
   a first fluid conduit directs a flow of cooling fluid from said first indirect heat exchanger, through said second indirect heat exchanger, and back to said first indirect heat exchanger;
   a direct heat exchanger, said direct heat exchanger receives said first outside air, and reduces an air temperature of said first outside air by wetting said first outside air to produce cooled outside air, and thereafter said cooled outside air enters through said outside air inlet of said second indirect heat exchanger;
   a pump in fluid communication with said first fluid conduit for circulating said cooling fluid between said first and second indirect heat exchangers, said pump circulating said cooling fluid at a fluid velocity of less than 4 feet per second;
   a valve in line with said first fluid conduit;
   a third heat exchanger;
   a secondary fluid conduit in fluid communication with said third heat exchanger, wherein said valve is selectively diverts at least a portion of said cooling fluid from said first fluid conduit into said secondary fluid conduit, said at least a portion of said cooling fluid circulates into said third heat exchanger, and said at least a portion of said cooling fluid returns to said first fluid conduit and into said first indirect heat exchanger via said secondary fluid conduit; and
   a chiller, said chiller conditions a refrigerant,
   wherein said chiller comprises:
      a compressor in fluid communication with said third heat exchanger; and
      a chiller exchanger in fluid communication with said compressor, said refrigerant circulates sequentially from said compressor, into said third exchanger back to said compressor before reaching said chiller exchanger, from said compressor to said chiller exchanger and returning to said compressor,
      said chiller exchanger having a chiller outside air inlet and a chiller outside air outlet, said chiller exchanger receives second outside air through said chiller outside air inlet, and said refrigerant transfers heat to said second outside air within said chiller exchanger thereby said chiller exchanger outputs cooled refrigerant to cool said cooling fluid within said third heat exchanger.

2. The cooling system as claimed in claim 1 wherein said fluid velocity is in a range of 1.1 to less than 4 feet per second.

3. The cooling system as claimed in claim 1 wherein said direct heat exchanger comprises a wetted evaporative cooling media, and said first outside air passes through said wetted evaporative cooling media.

4. The cooling system as claimed in claim 3 wherein said wetted evaporative cooling media comprises a rigid media of corrugated material.

5. The cooling system of claim 3 further comprising a fan for drawing said first outside air through said wetted evaporative cooling media and said second indirect heat exchanger at an air velocity of less than 400 feet per minute.

6. The cooling system as claimed in claim 5 wherein said air velocity is in a range of 150-200 feet per minute.

7. The cooling system as claimed in claim 1 further comprising a fan for drawing said return air through said first indirect heat exchanger at an air velocity of less than 500 feet per minute.

8. The cooling system of claim 7 wherein said air velocity is in a range of 250-350 feet per minute.

9. The cooling system as claimed in claim 1 wherein said chiller further comprises a direct chiller heat exchanger in line with said chiller exchanger, said direct chiller heat exchanger including a wetted evaporative cooling media arranged such that said second outside air passes through said wetted evaporative cooling media to produce cooled outside air for receipt at said chiller outside air inlet.

10. The cooling system as claimed in claim 1 further comprising a third indirect heat exchanger structurally arranged with said first indirect heat exchanger in a V-formation such that an apex of said V-formation of said first and third indirect heat exchangers is farther away from said return air inlet than a base of said V-formation of said first and third indirect heat exchangers.

11. The cooling system as claimed in claim 1 further comprising a third indirect heat exchanger structurally arranged with said second indirect heat exchanger in a V-formation such that an apex of said V-formation of said second and third indirect heat exchangers is farther away from said outside air inlet than a base of said V-formation of said second and third indirect heat exchangers.

* * * * *